(12) United States Patent
Askeland et al.

(10) Patent No.: US 6,547,354 B1
(45) Date of Patent: Apr. 15, 2003

(54) PRINTING SYSTEM THAT UTILIZES PRINT MASKS WITH RESOLUTIONS THAT ARE NON-INTEGRAL MULTIPLES OF EACH OTHER

(75) Inventors: Ronald A. Askeland, San Diego, CA (US); Chris Wykoff, San Diego, CA (US); William S. Osborne, Camas, WA (US)

(73) Assignee: Hewlett-Packard Company, Palo Alto, CA (US)

( * ) Notice: Subject to any disclaimer, the term of this patent is extended or adjusted under 35 U.S.C. 154(b) by 0 days.

(21) Appl. No.: 09/628,121

(22) Filed: Jul. 28, 2000

(51) Int. Cl.⁷ .............................. B41J 29/38; B41J 23/00
(52) U.S. Cl. ........................................ 347/12; 347/37
(58) Field of Search ............................ 347/40, 43, 9, 347/12, 37

(56) References Cited

U.S. PATENT DOCUMENTS 5,764,254 A * 6/1998 Nicoloff, Jr. et al. ......... 347/43
5,912,683 A * 6/1999 Eade ............................ 347/40
5,971,524 A   10/1999 Nicoloff, Jr. et al. ......... 347/43

OTHER PUBLICATIONS

EP Search Report.

* cited by examiner

*Primary Examiner*—Thinh Nguyen
(74) *Attorney, Agent, or Firm*—Dennis G. Stenstrom

(57) ABSTRACT

A method of operating a printing system having a media advance direction and a transverse direction that is perpendicular to the media advance direction and a first plurality of ink drop generators and a second plurality of ink drop generators by moving the first plurality of ink drop generators along the transverse direction while ejecting first ink droplets onto the media in a dot grid pattern having a first resolution in the transverse direction and moving the second plurality of ink drop generators along the transverse direction while ejecting second ink droplets onto the media in a second dot grid pattern having a second resolution in the transverse direction. The first and second resolutions being non-integer multiples of each other.

28 Claims, 8 Drawing Sheets

PRINTING SYSTEM THAT UTILIZES PRINT MASKS WITH RESOLUTIONS THAT ARE NON-INTEGRAL MULTIPLES OF EACH OTHER

CROSS-REFERENCE TO RELATED APPLICATIONS

This patent application is related to U.S. application Ser. No. 09/627,923, filed Jul. 18, 2001, entitled "Printing System That Utilizes Continuous and Non-continuous Firing Frequencies;" U.S. application Ser. No. 09/399,534, filed Sep. 20, 1999, entitled "Hybrid Printmask for Multidrop Inkjet Printer;" U.S. application Ser. No. 09/399,473, filed Sep. 20, 1999, entitled "Banding Reduction in Multipass Printing;" U.S. application Ser. No. 09/399,430, filed Sep. 20, 1999, entitled "Customizing Printmasks for Printhead Nozzle Aberrations;" U.S. application Ser. No. 08/957,853, filed Oct. 27, 1997, entitled "Method of Generating Randomized Masks to Improve Image Quality on a Printing Medium;" U.S. patent application Ser. No. 09/240,177, filed Jan. 30, 1999, entitled "Ink Ejection Element Firing Order to Minimize Horizontal Banding and the Jaggedness of Vertical Lines;" U.S. patent application Ser. No. 09/016,478, filed Jan. 30, 1998, entitled "Hybrid Multi-Drop/Multi-Pass Printing System;" and U.S. patent application Ser. No. 08/962,031, filed Oct. 31, 1997, entitled "Ink Delivery System for High Speed Printing." The foregoing commonly assigned patent applications are herein incorporated by reference.

FIELD OF THE INVENTION

The present invention generally relates to inkjet printers and more particularly to apparatus and methods for generating high quality images on a color inkjet printer.

BACKGROUND OF THE INVENTION

Thermal inkjet hardcopy devices such as printers, large format plotters/printers, facsimile machines and copiers have gained wide acceptance. These hardcopy devices are described by W. J. Lloyd and H. T. Taub in "Ink Jet Devices," Chapter 13 of *Output Hardcopy Devices* (Ed. R. C. Durbeck and S. Sherr, San Diego: Academic Press, 1988) and U.S. Pat. Nos. 4,490,728 and 4,313,684. The basics of this technology are further disclosed in various articles in several editions of the *Hewlett-Packard Journal* [Vol. 36, No. 5 (May 1985), Vol. 39, No. 4 (August 1988), Vol. 39, No. 5 (October 1988), Vol. 43, No. 4 (August 1992), Vol. 43, No. 6 (December 1992) and Vol. 45, No. 1 (February 1994)], incorporated herein by reference. Inkjet hardcopy devices produce high quality print, are compact and portable, and print quickly and quietly because only ink strikes the paper.

An inkjet printer forms a printed image by printing a pattern of individual dots at particular locations of an array defined for the printing medium. The locations are conveniently visualized as being small dots in a rectilinear array. The locations are sometimes "dot locations", "dot positions", or pixels". Thus, the printing operation can be viewed as the filling of a pattern of dot locations with dots of ink.

Inkjet hardcopy devices print dots by ejecting very small drops of ink onto the print medium and typically include a movable carriage that supports one or more printheads each having ink ejecting nozzles. The carriage traverses over the surface of the print medium, and the nozzles are controlled to eject drops of ink at appropriate times pursuant to command of a microcomputer or other controller, wherein the timing of the application of the ink drops is intended to correspond to the pattern of pixels of the image being printed.

The typical inkjet printhead (i.e., the silicon substrate, structures built on the substrate, and connections to the substrate) uses liquid ink (i.e., dissolved colorants or pigments dispersed in a solvent). It has an array of precisely formed orifices or nozzles attached to a printhead substrate that incorporates an array of ink ejection chambers which receive liquid ink from the ink reservoir. Each chamber is located opposite the nozzle so ink can collect between it and the nozzle. The ejection of ink droplets is typically under the control of a microprocessor, the signals of which are conveyed by electrical traces to the ink ejection element. When electric printing pulses activate the ink ejection element, a small portion of the ink next to it vaporizes and ejects a drop of ink from the printhead. Properly arranged nozzles form a dot matrix pattern. Properly sequencing the operation of each nozzle causes characters or images to be printed upon the paper as the printhead moves past the paper.

The ink cartridge containing the nozzles is moved repeatedly across the width of the medium to be printed upon. At each of a designated number of increments of this movement across the medium, each of the nozzles is caused either to eject ink or to refrain from ejecting ink according to the program output of the controlling microprocessor. Each completed movement across the medium can print a swath approximately as wide as the number of nozzles arranged in a column of the ink cartridge multiplied times the distance between nozzle centers. After each such completed movement or swath the medium is moved forward the width of the swath, and the ink cartridge begins the next swath. By proper selection and timing of the signals, the desired print is obtained on the medium.

Color inkjet hardcopy devices commonly employ a plurality of print cartridges, usually two to four, mounted in the printer carriage to produce a full spectrum of colors. In a printer with four cartridges, each print cartridge can contain a different color ink, with the commonly used base colors being cyan, magenta, yellow, and black. In a printer with two cartridges, one cartridge can contain black ink with the other cartridge being a tri-compartment cartridge containing the base color cyan, magenta and yellow inks, or alternatively, two dual-compartment cartridges may be used to contain the four color inks. In addition, two tri-compartment cartridges may be used to contain six base color inks, for example, black, cyan, magenta, yellow, light cyan and light magenta. Further, other combinations can be employed depending on the number of different base color inks to be used.

The base colors are produced on the media by depositing a drop of the required color onto a dot location, while secondary or shaded colors are formed by depositing multiple drops of different base color inks onto the same or an adjacent dot location, with the overprinting of two or more base colors producing the secondary colors according to well established optical principles. In color printing, the various colored dots produced by each of the print cartridges are selectively overlapped to create crisp images composed of virtually any color of the visible spectrum. To create a single dot on paper having a color which requires a blend of two or more of the colors provided by different print cartridges, the nozzle plates on each of the cartridges must be precisely aligned so that a dot ejected from a selected nozzle in one cartridge overlaps a dot ejected from a corresponding nozzle in another cartridge.

The specific partial-inking pattern employed in each pass, and the way in which these different patterns add up to a single fully inked image, is known as a "printmode." The concept of printmodes is a useful and well-known technique of laying down in each pass of the printhead only a fraction of the total ink required in each section of the image, so that any areas left white in each pass are filled in by one or more later passes do not print all the required drops of all ink colors in all pixel locations in the swath in one single scan, or "pass", of the printheads across the media. Rather, multiple scans are used to deposit the full amount of ink on the media, with the media being advanced after each pass by only a portion of the height of the printed swath. In this way, areas of the media can be printed in on more than one-pass. In a printer which uses such a "multi-pass" printmode, only a fraction of the total drops of ink needed to completely print each section of the image is laid down in each row of the printed medium by any single pass; areas left unprinted are filled in by one or more later passes.

The print quality produced from an inkjet device is dependent upon the reliability of its ink ejection elements. A multi-pass print mode can partially mitigate the impact of the malfunctioning ink ejection elements on the print quality because each pass uses a different nozzle to print a particular row of the image, multi-pass printing can compensate for nozzle defects. In addition, multi-pass print modes tend to control bleed, blocking and cockle by reducing the amount of liquid that is on the page at any given time.

Printmodes allow a trade-off between speed and image quality. For example, a printer's draft mode provides the user with readable text as quickly as possible. Presentation, also known as best mode, is slow but produces the highest image quality. Normal mode is a compromise between draft and presentation modes. Printmodes allow the user to choose between these trade-offs. It also allows the printer to control several factors during printing that influence image quality, including: 1) the amount of ink placed on the media per dot location, 2) the speed with which the ink is placed, and, 3) the number of passes required to complete the image. Providing different printmodes to allow placing ink drops in multiple swaths can help with hiding nozzle defects. Different printmodes are also employed depending on the media type.

One-pass mode operation is used for increased throughput on plain paper. Use of this mode on other papers will result in too large of dots on coated papers, and ink coalescence on polyester media. In a one-pass mode, all dots to be fired on a given row of dots are placed on the medium in one swath of the printhead, and then the print medium is advanced into position for the next swath. A two-pass printmode is a print pattern wherein one-half of the dots available for a given row of available dots per swath are printed on each pass of the printhead, so two passes are needed to complete the printing for a given row. Similarly, a four-pass mode is a print pattern wherein one fourth of the dots for a given row are printed on each pass of the printhead. In a printmode of a certain number of passes, each pass should print, of all the ink drops to be printed, a fraction equal roughly to the reciprocal of the number of passes.

A printmode usually encompasses a description of a "printmask," or several printmasks, used in a repeated sequence and the number of passes required to reach "full density," and also the number of drops per pixel defining what is meant by full density. The pattern used in printing each nozzle section is known as "printmask." A printmask is a binary pattern that determines exactly which ink drops are printed in a given pass or, to put the same thing in another way, which passes are used to print each pixel. Thus, the printmask defines both the pass and the nozzle which will be used to print each pixel location, i.e., each row number and column number on the media. The printmask can be used to "mix up" the nozzles used, as between passes, in such a way as to reduce undesirable visible printing artifacts.

Previous printers have always used black and color printmasks with resolutions that are integer multiples of each other. This limits the ability to optimize ink saturation and firing frequency for black and color print cartridges because the black and color printmask dot grids are limited to integer multiples of each other. The present invention allows the number of drops of ink for black and dot grids to be non-integral multiples of each other. This allows greater flexibility in placing the optimum amount of ink on the print media for each color.

Accordingly, it would be advantageous to have greater flexibility in writing system design by not limiting the black and color printmask dot grids to integer multiples of each other. This would allow the number of drops of ink for black and color dot grids to be non-integral multiples of each other and would allow for greater flexibility in placing the optimum amount of ink on the print media for each color.

SUMMARY OF THE INVENTION

The present invention is a method of operating a printing system having a printing-medium advance direction and a transverse direction that is perpendicular to the printing-medium advance direction and a first plurality of ink drop generators and a second plurality of ink drop generators by moving the first plurality of ink drop generators along the transverse direction while ejecting first ink droplets onto the printing medium in a dot grid pattern having a first resolution in the transverse direction and moving the second plurality of ink drop generators along the transverse direction while ejecting second ink droplets onto the printing medium in a second dot grid pattern having a second resolution in the second resolution in the transverse direction. The first and second resolutions are non-integer multiples of each other.

DETAILED DESCRIPTION OF THE PREFERRED EMBODIMENTS

While the present invention will be described below in the context of an off-axis printer having an external ink source, it should be apparent that the present invention is also useful in an inkjet printer which uses inkjet print cartridges having an ink reservoir integral with the print cartridge.

Figure 1:
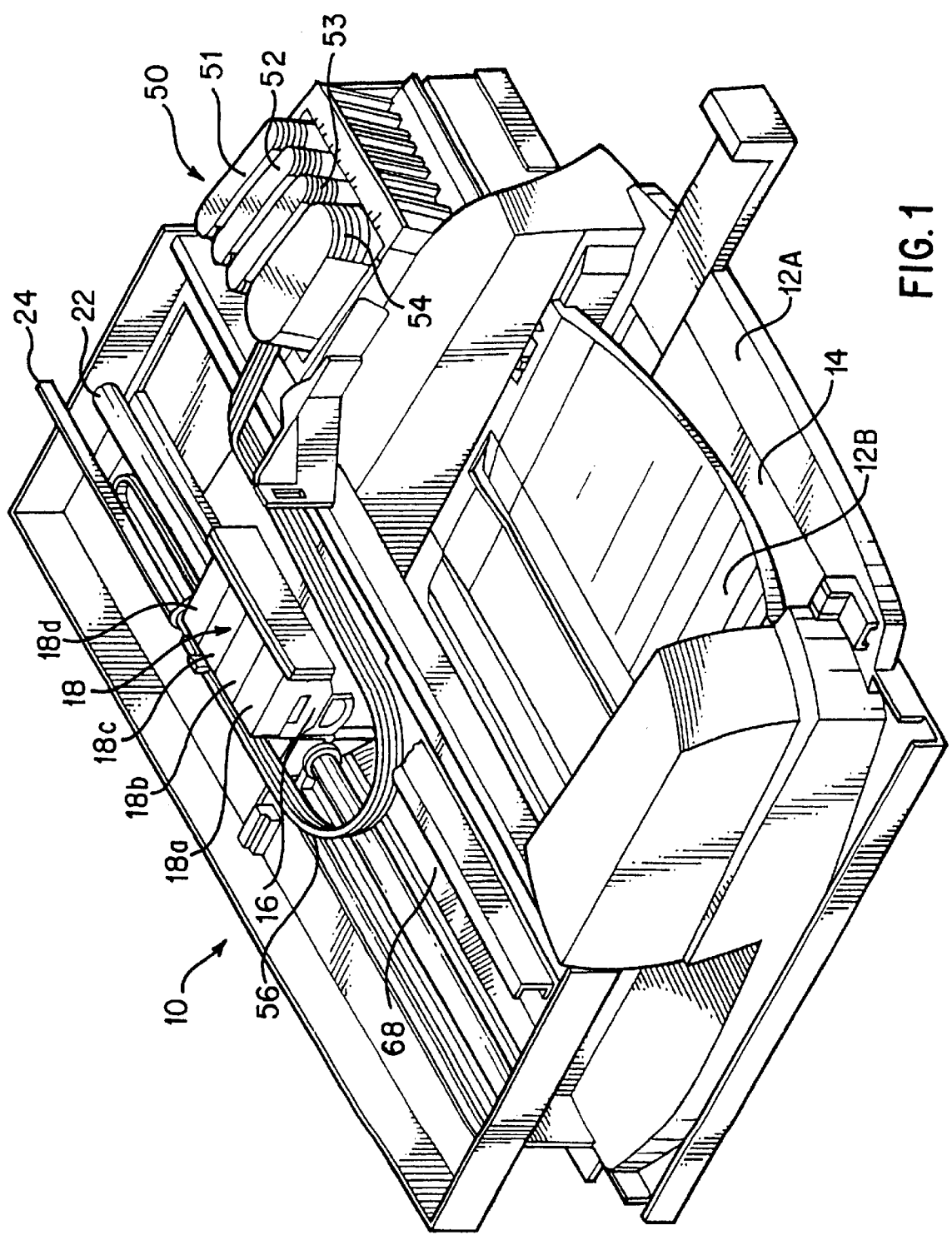
FIG. 1 is a perspective view of one embodiment of an inkjet printer incorporating the present invention.

FIG. 1 is a perspective view of one embodiment of an inkjet printer 10 suitable for utilizing the present invention, with its cover removed. Generally, printer 10 includes a tray 12 for holding media 14. When a printing operation is initiated, a sheet of media 14 from tray 12A is fed into printer 10 using a sheet feeder, then brought around in a U direction to now travel in the opposite direction toward tray 12B. A carriage unit 16 supports and carries a set of removably mounted print cartridges 18. The carriage 16 is supported from below on a slide rod 22 that permits the carriage 16 to move under the directing force of a carriage mechanism. The media is stopped in a print zone 68 and the scanning carriage 16 is scanned across the media 14 for printing a swath of ink thereon. The printing may occur while the carriage is scanning in either directional. This is referred to as bi-directional printing. After a single scan or multiple scans, the media 14 is then incrementally shifted using a conventional stepper motor and feed rollers to a next position within the print zone 68 and carriage 16 again scans across the media 14 for printing a next swath of ink. When the printing on the media is complete, the media is forwarded to a position above tray 12B, held in that position to ensure the ink is dry, and then released.

The carriage scanning mechanism may be conventional and generally includes a slide rod 22, along which carriage 16 slides, a flexible circuit (not shown in FIG. 1) for transmitting electrical signals from the printer's microprocessor to the carriage 16 and print cartridges 18 and a coded strip 24 which is optically detected by a photo detector in carriage 16 for precisely positioning carriage 16. A stepper motor (not shown), connected to carriage 16 using a conventional drive belt and pulley arrangement, is used for transporting carriage 16 across the print zone 68.

The features of inkjet printer 10 include an ink delivery system for providing ink to the print cartridges 18 and ultimately to the ink ejection chambers in the printheads from an off-axis ink supply station 50 containing replaceable ink supply cartridges 51, 52, 53, and 54, which may be pressurized or at atmospheric pressure. For color printers, there will typically be a separate ink supply cartridge for black ink, yellow ink, magenta ink, and cyan ink. Four tubes 56 carry ink from the four replaceable ink supply cartridges 51–54 to the print cartridges 18.

The carriage 16 holds a set of ink cartridges 18 that incorporate a black print cartridge 18a, and a set of color ink print cartridges 18b–18d for the colors of cyan, magenta, and yellow, respectively. The print cartridges each incorporate a black ink printhead 79a, and a set of color ink printheads 79b–79d for the colors of cyan, magenta, and yellow, respectively. Each of the printheads may be like printhead 79 shown in FIG. 2. Each of the printheads 79a–79d includes a plurality of inkjet nozzles 82 for ejecting the ink droplets that form the textual and object images in a given page of information.

In operation, the printer 10 responds to commands by printing full color or black print images on the print medium 14 which is mechanically retrieved from the feed tray 12A. The printer 10 operates in a multi-pass print mode to cause one or more swaths of ink droplets to be ejected onto the printing medium 14 to form a desired image. Each swath is formed in a pattern of individual dots that are deposited at particular pixel locations in an N by M array defined for the printing medium. The pixel locations are conveniently visualized as being small ink droplet receiving areas grouped in a matrix array.

Figure 2:
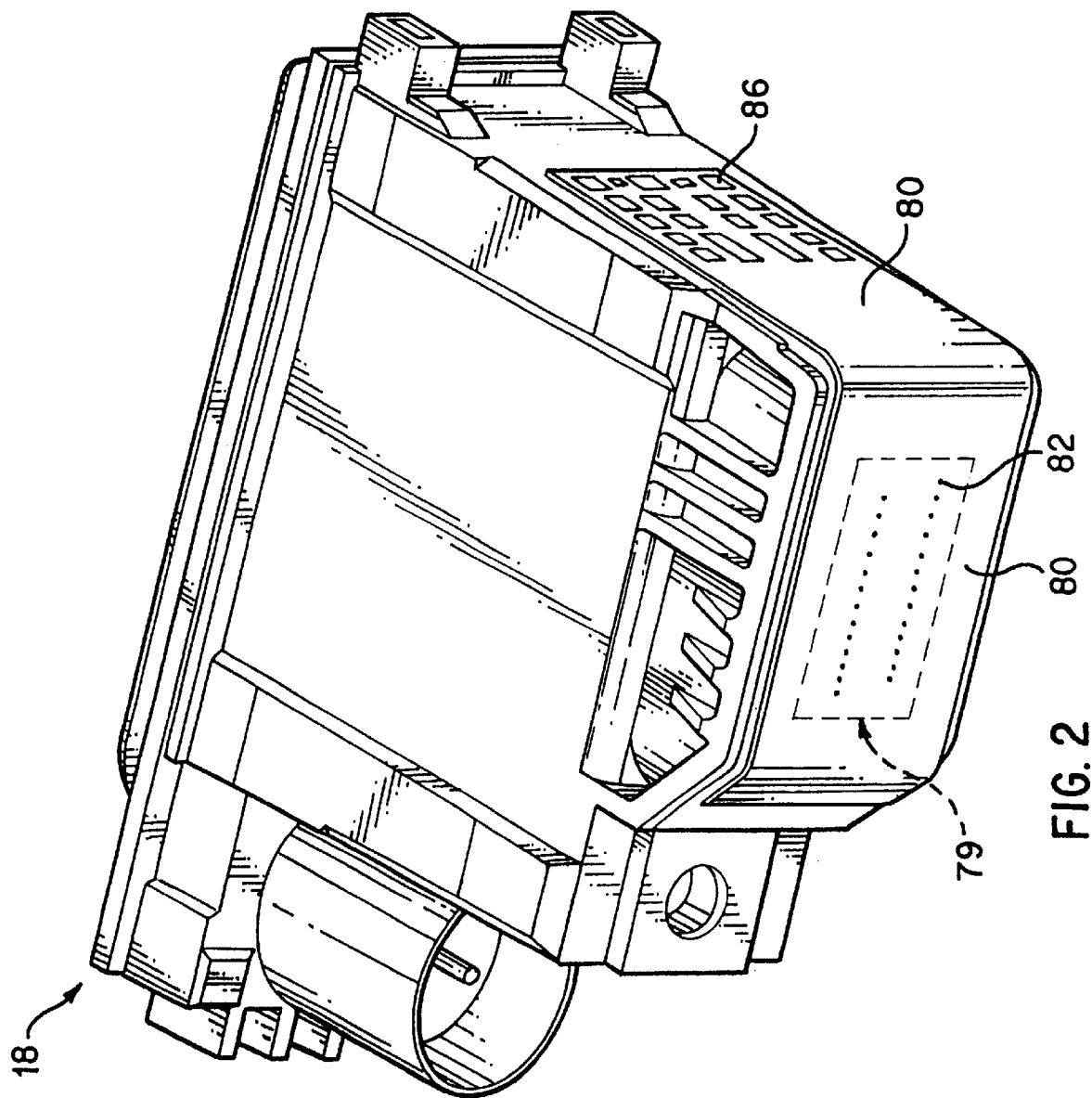
FIG. 2 is a bottom perspective view a single print cartridge.

Referring to FIG. 2, a flexible circuit 80 containing contact pads 86 is secured to print cartridge 18. Contact pads 86 align with and electrically contact printer electrodes on carriage 16 (not shown) when print cartridge 18 is installed in printer 10 to transfer externally generated energization signals to printhead assembly 79. Flexible circuit 80 has a nozzle array consisting of two rows of nozzles 82 which are laser ablated through flexible circuit 80. Mounted on the back surface of flexible circuit 80 is a silicon substrate (not shown). The substrate includes a plurality of ink ejection chambers with individually energizable ink ejection elements therein, each of which is located generally behind a single orifice or nozzle 82. The substrate includes a barrier layer which defines the geometry of the ink ejection chambers and ink channels formed therein. The ink channels are in fluidic comununication ink ejection chambers and with an ink reservoir. The back surface of flexible circuit 80 includes conductive traces formed thereon. These conductive traces terminate in contact pads 86 on a front surface of flexible circuit 80. The other ends of the conductive traces are bonded to electrodes on the substrate.

Further details on printhead design and electronic control of inkjet printheads are described in U.S. patent application Ser. No. 09/240,177, filed Jan. 30, 1999, entitled "Ink Ejection Element Firing Order to Minimize Horizontal Banding and the Jaggedness of Vertical Lines;" U.S. patent application Ser. No. 09/016,478, filed Jan. 30, 1998, entitled "Hybrid Multi-Drop/Multi-Pass Printing System;" U.S. patent application Ser. No. 08/962,031, filed Oct. 31, 1997, entitled "Ink Delivery System for High Speed Printing;" U.S. patent application, Ser. No. 08/608,376, filed Feb. 28, 1996, entitled "Reliable High Performance Drop Generator For An Inkjet Printhead;" U.S. patent application Ser. No. 09/071,138, filed Apr. 30, 1998, entitled "Energy Control Method for an Inkjet Print Cartridge;" U.S. patent application Ser. No. 08/958,951, filed Oct. 28, 1997, entitled "Thermal Ink Jet Print Head and Printer Energy Control Apparatus and Method;" and U.S. Pat. No. 5,648,805, entitled "Inkjet Printhead Architecture for High Speed and High Resolution Printing;" The foregoing commonly assigned patent applications are herein incorporated by reference.

Figure 3:
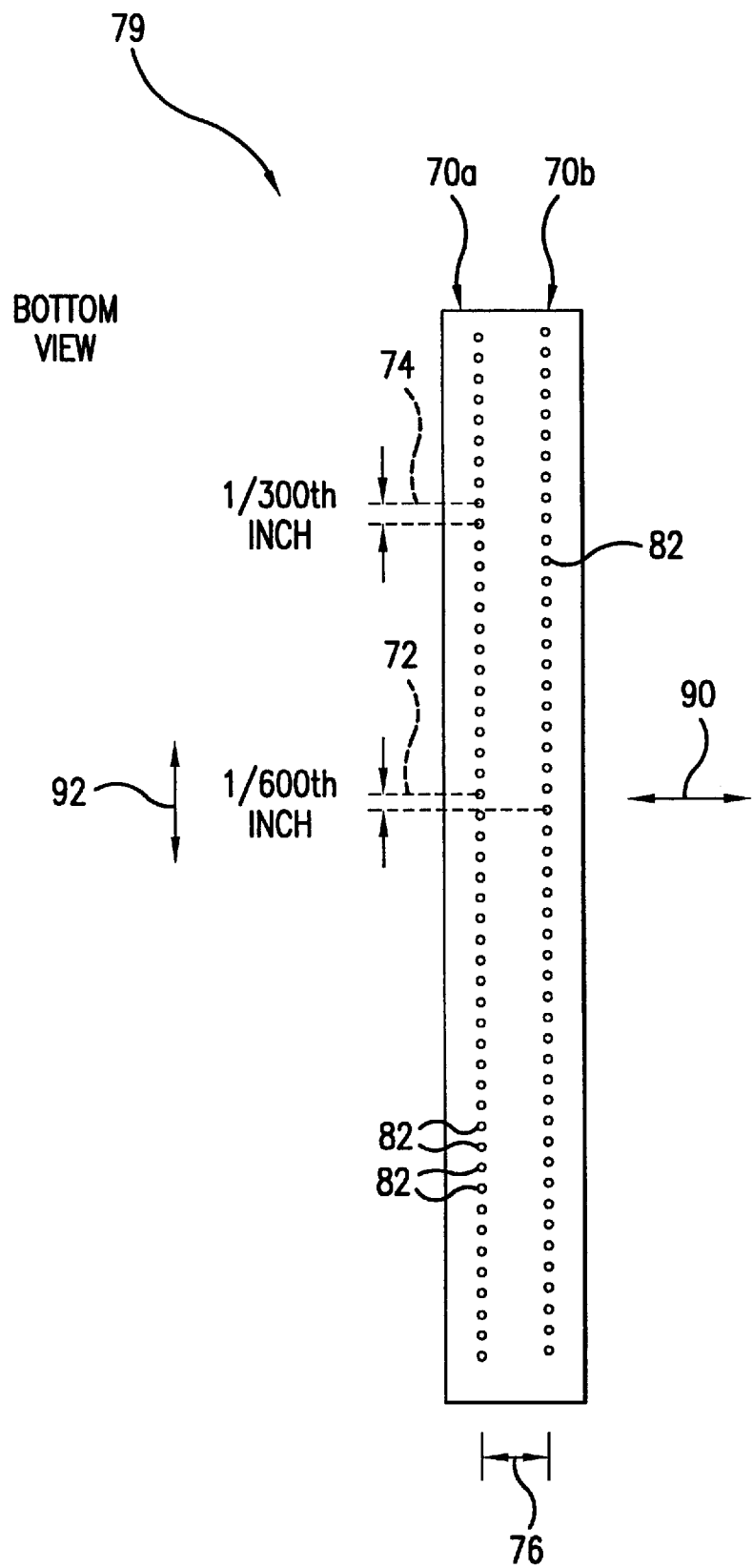
FIG. 3 is a schematic diagram of the nozzle arrangement of the printhead of FIG. 2.

Referring to FIG. 3, a preferred embodiment of a printhead 79 has two vertical columns 70a–b of nozzles which, when the printhead 79 is installed in the printer 10, are perpendicular to the scan or transverse direction 90. The columnar vertical spacing 74 between adjacent nozzles in a column is typically 1/300th inch in present-day printheads. However, by using two columns instead of one and logically treating the nozzles as a single column, the effective vertical spacing 72 between logical nozzles is reduced to 1/600th inch, thus achieving improved printing resolution in the direction of the media advance direction 92. As an illustration, the print controller 32 would print a vertical column of 1/600th inch pixel locations on the print medium 18 by depositing ink from column 70a, then moving the printhead 79 in the scan direction 90 the inter-column distance 76 before depositing ink from column 70b.

Figure 4:
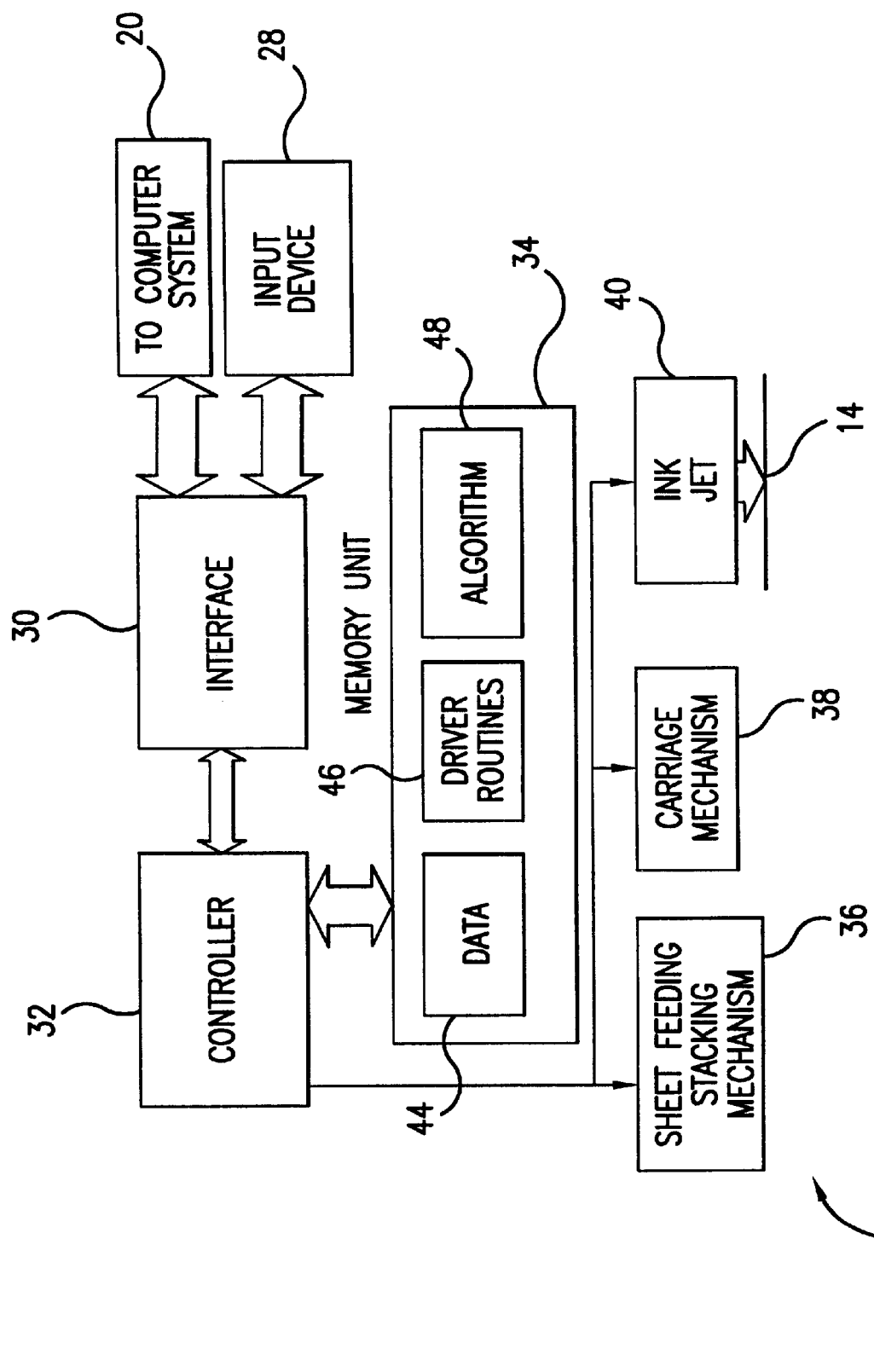
FIG. 4 is a block diagram of the hardware components of the inkjet printer of FIG. 1.

Considering now the printer 10 in greater detail with reference to FIGS. 1 and 4, the printer 10 generally includes a controller 32 that is coupled to a computer system 20 via an interface unit 30. The interface unit 30 facilitates the transferring of data and command signals to the controller 32 for printing purposes. The interface unit 30 also enables the printer 10 to be coupled electrically to an input device 28 for the purpose of downloading print image information to be printed on a print medium 14. Input device 28 can be any type peripheral device that can be coupled directly to the printer 10.

In order to store the data, the printer 10 further includes a memory unit 34. The memory unit 34 is divided into a plurality of storage areas that facilitate printer operations. The storage areas include a data storage area 44; a storage area for driver routines 46; and a control storage area 48 that holds the algorithms that facilitate the mechanical control implementation of the various mechanical mechanisms of the printer 10.

The data storage area 44 receives the data profile files that define the individual pixel values that are to be printed to form a desired object or textual image on the medium 14. The storage area 46 contains printer driver routines. The control storage area 48 contains the routines that control 1) a sheet feeding stacking mechanism for moving a medium through the printer from a supply or feed tray 12A to an output tray 12B; and 2) a carriage mechanism that causes a printhead carriage unit 16 to be moved across a print medium on a guide rod 22. In operation, the high speed inkjet printer 10 responds to commands by printing full color or black print images on the print medium which is mechanically retrieved from the feed tray 12A.

The specific partial-inking pattern employed in each pass, and the way in which these different patterns add up to a single fully inked image, is known as a "printmode." Printmodes allow a trade-off between speed and image quality. For example, a printer's draft mode provides the user with readable text as quickly as possible. Presentation, also known as best mode, is slow but produces the highest image quality. Normal mode is a compromise between draft and presentation modes. Printmodes allow the user to choose between these trade-offs. It also allows the printer to control several factors during printing that influence image quality, including: 1) the amount of ink placed on the media per dot location, 2) the speed with which the ink is placed, and, 3) the number of passes required to complete the image. Providing different printmodes to allow placing ink drops in multiple swaths can help with hiding nozzle defects. Different printmodes are also employed depending on the media type.

One-pass mode operation is used for increased throughput on plain paper. Use of this mode on other papers will result in too large of dots on coated papers, and ink coalescence on polyester media. In a one-pass mode, all dots to be fired on a given row of dots are placed on the medium in one swath of the printhead, and then the print medium is advanced into position for the next swath. A two-pass printmode is a print pattern wherein one-half of the dots available for a given row of available dots per swath are printed on each pass of the printhead, so two passes are needed to complete the printing for a given row. Similarly, a four-pass mode is a print pattern wherein one fourth of the dots for a given row are printed on each pass of the printhead. In a printmode of a certain number of passes, each pass should print, of all the ink drops to be printed, a fraction equal roughly to the reciprocal of the number of passes.

A printmode usually encompasses a description of a "printmask," or several printmasks, used in a repeated sequence and the number of passes required to reach "full density," and also the number of drops per pixel defining what is meant by full density. The pattern used in printing each nozzle section is known as "printmask." A printmask is a binary pattern that determines exactly which ink drops are printed in a given pass or, to put the same thing in another way, which passes are used to print each pixel. Thus, the printmask defines both the pass and the nozzle which will be used to print each pixel location, i.e., each row number and column number on the media. The printmask can be used to "mix up" the nozzles used, as between passes, in such a way as to reduce undesirable visible printing artifacts.

The printer 10 operates in a multi-pass print mode to cause one or more swaths of ink droplets to be ejected onto the printing medium to form a desired image. Each swath is formed in a pattern of individual dots that are deposited at particular pixel locations in an N by M array defined for the printing medium. The pixel locations are conveniently visualized as being small ink droplet receiving areas grouped in a matrix array.

A print controller 32 controls the carriage 16 and media 14 movements and activates the nozzles 82 for ink drop deposition. By combining the relative movement of the carriage 16 along the scan direction 90 with the relative movement of the print medium 14 along the medium advance direction 92, each printhead 79 can deposit one or more drops of ink at each individual one of the pixel locations on the print medium 14. A printmask is used by the print controller 32 to govern the deposition of ink drops from the printhead 79. Typically a separate printmask exists for each discrete intensity level of color (e.g. light to dark) supported by the printer 10. For each pixel position in a row during an individual printing pass, the printmask has a mask pattern which both (a) acts to enable the nozzle positioned adjacent the row to print, or disable that nozzle from printing, on that pixel location, and (b) defines the number of drops to be deposited from enabled nozzles. Whether or not the pixel will actually be printed on by the corresponding enabled nozzle depends on whether the image data to be printed requires a pixel of that ink color in that pixel location. The printmask is typically implemented in firmware in the printer 10, although it can be alternatively implemented in a software driver in a computing processor (not shown) external to the printer.

The term "printing pass", as used herein, refers to those passes in which the printhead is enabled for printing as the nozzle arrangement moves relative to the medium 14 in the scan direction 90; in a bidirectional printer, each forward and rearward pass along the scan direction 90 can be a printing pass, while in a unidirectional printer printing passes can occur in only one of the directions of movement. In a given pass of the carriage 16 over the print medium 14 in a multi-pass printer 10, only certain pixel locations enabled by the printmask can be printed, and the printer 10 deposits the number of drops specified by the printmask for the corresponding pixel locations if the image data so requires. The printmask pattern is such that additional drops for the certain pixel locations, as well as drops for other pixel locations in the swath, are filled in during other printing passes.

Figure 6C:
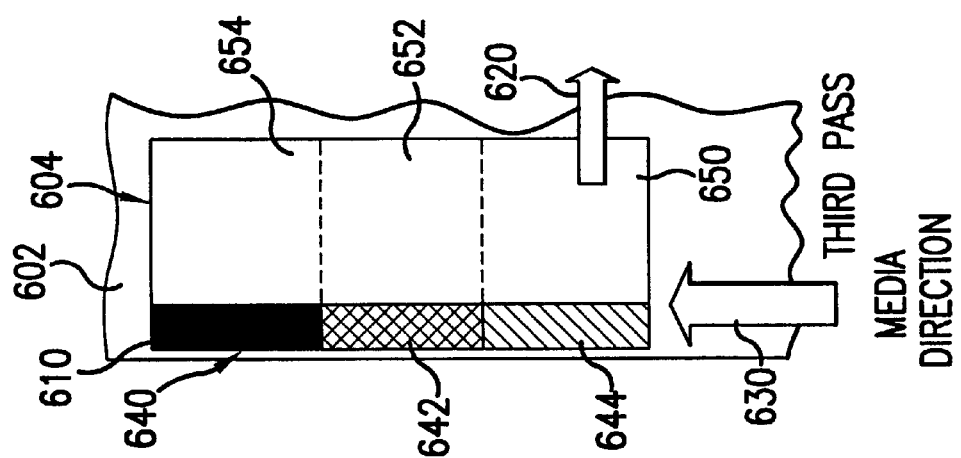
FIGS. 6A–C are diagrammatic illustrations of forming a swath of image information on a printing medium in a three-pass print mode.
Figure 6B:
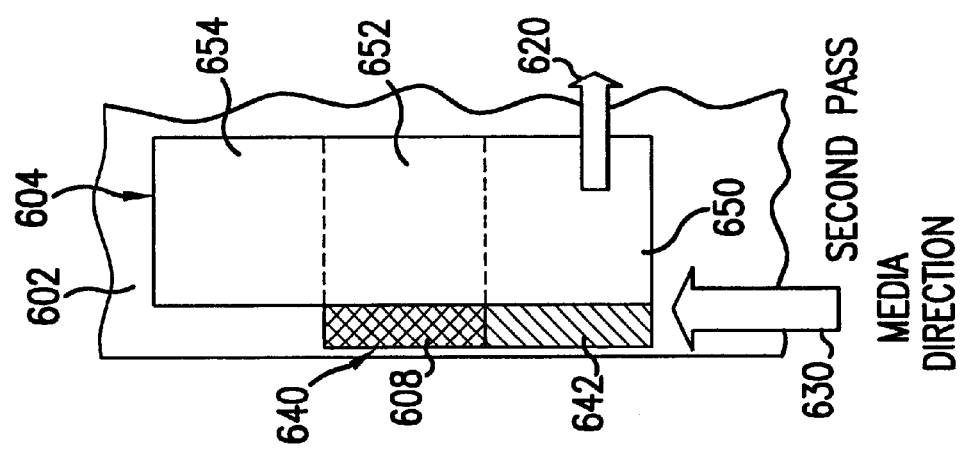
Figure 6A:
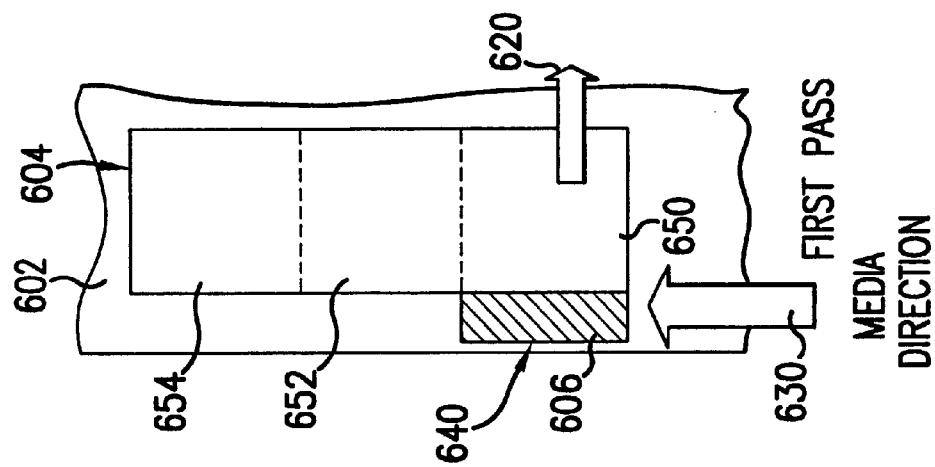

FIGS. 6A–6C are diagrammatic illustrations of a multi-pass print mode, wherein a swath on a print medium 602 is defined as an ink droplet deposit area covered during one sweep of the inkjet printhead 604. The ink droplet deposit area in the preferred embodiment of the present invention has a width that corresponds to the image width and a height defined by the height of the total number of nozzles in the printhead 604.

Thus, if a three-pass print mode is assumed as illustrated in FIGS. 6A–6C, the ink droplet deposit area includes an area 640, an area 642, and an area 644 that are covered with ink droplets during one sweep of the printhead 604. As will be explained hereinafter in greater detail, the ink droplet deposit areas 640, 642, and 644 receive ink droplets from one or more of the three groups of printhead nozzles indicated generally at 650, 652 and 654 respectively.

Referring now to the ink droplet deposit area 640, which is a subset of the N by M image matrix array, the illustrates of FIGS. 6A–6C are examples applicable to the complete image. Area 640 has a width that corresponds to the width M of the complete image and a height that corresponds to one-third of the height of the height dimension covered the inkjet nozzles of the printhead 604. As best seen in FIG. 6A, as the printhead 604 traverses above the medium 602, the printhead 604 travels along a sweep path indicated generally at 620. As the printhead 604 traverses along the sweep path 620 during a first pass, the nozzles in group 650 eject drops of ink droplets onto the medium 602. The density of the ink droplets deposited on the print medium 602 in the ink droplet deposit area 640 during the first pass, is indicated generally at 606. When the printhead 604 reaches the end of the sweep path 620, the medium 602 is advanced an incremental step along a medium path of travel indicated generally at 630. In this regard, that part of the medium corresponding to the ink droplet deposit area 640, is advanced to be in alignment with the inkjet nozzles in group 652 as best seen in FIG. 6B.

Referring to FIG. 6B, as the printhead 604 again traverses above the medium 602 during a second pass along the sweep path 620, the nozzles in group 652 eject ink droplets onto the medium 602 in the ink droplet deposit area 640. As a result of depositing additional ink droplets during the second pass, there is an increase in the density of ink droplets in the ink droplet deposit area 640, which is indicated generally at 608 as a darker shade. When the printhead 604 reaches the end of the sweep path 620 during the second pass, the medium 604 is advanced incrementally once again so that the ink droplet deposit area 640 is advanced to be in alignment with the inkjet nozzles in group 654 as shown in FIG. 6C.

Referring to FIG. 6C, a third pass of the printhead 604 along the sweep path 620 is illustrated. During the third pass, the nozzles in group 654 eject drops of ink droplets onto the medium 602 in the ink droplet deposit area 640. The deposit of additional ink droplets again increases the density of the ink droplets in area 640, which is indicated generally at 610 as a still further darker shade. From the foregoing, those skilled in the art will understand the darkest shade at 610 results from the ink droplet deposit area 640 receiving ink droplets during each of the three passes in the foregoing illustrative three-pass print mode operation.

It can be seen that the image information in area 640 is divided into three groups and printed over three passes by the respective ones of the inkjet nozzles 650, 652 and 654. Although the illustrative example has concentrated on the ink droplet deposit area 640, the other portions of the swath cover other areas similar to that area indicated at 640. These other areas, through proper media advances and inkjet nozzle ejections during sweeps of the printhead 604 along the sweep path 620, are covered with ink droplets during each of the three passes in a similar manner, except for margin areas when the printhead nozzles are disposed at the top or bottom of the image.

More specifically, in FIGS. 6B and 6C, the area 642 receives ink droplets from the nozzles in group 650 during a first pass and ink droplets from the nozzles in group 652 during a second pass. In a similar manner, the area 644 receives ink droplets from the nozzles in group 650 during the above-mentioned second pass.

The path of travel followed by the print carriage 16, such as the sweep path 620, is traverse or perpendicular to the path of travel followed by the sheet 604 as it passes through a print zone, indicated generally at 68. In this regard, when a print operation is initiated by the print controller 32, in response to a print command from the computer system 20, the sheet feed stacking mechanism 36 causes the sheet 604 to be moved from the supply tray 12A along a medium path of travel, such as path 630, and into the print zone 68, where the sheet 604 is stopped temporarily for printing purposes. When the sheet 604 stops along its path of travel, the carriage mechanism 38 causes the carriage 16 to scan across the sheet 604 Z number of times allowing one or more printheads to eject drops of ink via associated ones of their nozzles. The ejection of the ink droplets at appropriate times onto the medium 604 and in desired patterns is controlled by the print controller 32, wherein the timing of the application of the ink droplets onto the sheet 604 correspond to the pattern of image pixels being printed. The Z number of times the carriage 16 travels across the print medium 604 between 2 time and 16 times depending on the ink drop density deposited on the medium 604.

In one mode of operation, the controller 32 causes a stepper motor and an associated set of feed rollers (not shown) forming part of the sheet feeding stacking mechanism 36 to be actuated at the end of each pass causing the sheet 604 to be incrementally shifted or moved along its path of travel to a next printing position within the print zone 68.

When the sheet 604 comes to rest at the next position in the print zone 68, the carriage 16 is scanned across the sheet 604 for printing another portion of the image information. When the sheet 604 has been advanced through each of its printing positions in the print zone 68 so that printing of the desired information is completed, the sheet 604 is moved out from the print zone 68 into the output tray 12B.

Considering now the operation of the inkjet printer 10, under the command of a user, the computer system 20 assembles a predetermined quantity of data that is indicative of an object or document to be printed on the printing medium 604. In order to produce a hard copy of the object or document to be printed, the computer system 20 sends the predetermined quantity of data to the inkjet printer 10. The inkjet printer 10 in turn, temporarily stores the data received from the computer system 20 and then retrieves the data causing it to be printed or recorded on the medium 604 in the form of a plurality of ink droplets which are rapidly ejected from the printhead nozzles, as the carriage 16 traverses in a reciprocating rectilinear path of travel across the medium 604.

The algorithm 100 causes the controller 32 to apply the individual printmasks in the set of Z printmasks to the image information to be printed. The printmask application allows the image information to be separated into and then covered by Z passes, thus minimizing the printing of adjacent pixels and effectively reducing the visible effects of poor nozzle performance. A well designed set of printmasks thus facilitates printing in a multi-pass mode and significantly reduces artifacts.

As best seen in FIGS. 6A–6C, the resulting three-pass print mode swath is formed by the ejection of ink droplets from the three respective groups of nozzles 650, 652, and 654 of the printhead 604. The area indicated by 640, over the three passes, is covered by each of the three groups of nozzles 650, 652 and 654 successively. The image information deposited in area 640 is separated into passes to minimize artifacts and to complete the total image information in area 640. A first printmask is applied to the image data in area 640 and the resulting information is printed by nozzle group 650 as illustrated in FIG. 6A. After the medium advances, a second printmask, that corresponds to the first is applied to the image information in area 640, and the result is printed by the nozzle group 652. After a third advance of the medium 602, and application of a third printmask, the information is printed by the nozzle group 654. In this manner, the image information in area 640 is divided by the set of three printmasks and completely printed in the three passes. For those skilled in the art, it should be clear that the nozzles groups 652 and 654 in FIG. 6A, are ejecting ink droplets relative to second and third passes over other areas similar to area 640, respectively. Similar situations occur relative to FIGS. 6B and 6C.

Although each ink droplet receiving area, such as area 640, is governed by one set of printmasks within a group of Z, it is important that the pattern within each printmask in the set does not repeat small ordered patterns, such as occurs when small 2×2 or 4×4 printmask matrix arrays are applied. It is also effective in reducing patterns, that adjacent areas relative to the area 640 do not use the exact same printmasks for their ink droplet receiving areas. It is also beneficial, that in a set of printmasks, that each printmask matrix array be structured in a large matrix array that is substantially larger than a four by four printmask matrix array. The most preferred printmask matrix array size is defined with a height n that corresponds to the full height of the printhead 604 and with a width M that corresponds to about 256 locations. Thus, for example, one preferred printmask matrix array size is 600×128. A more preferred printmask matrix array size is 300×64, and the most preferred printmask matrix array size is 128 by 32. From the foregoing, it should be understood by those skilled in the art, that each adjacent area such as that in area 640, utilizes a portion of the large printmask matrix array and thus, limits the repeating pattern over the printed image. As mentioned herein, those portions of the matrix array utilized in each printmask for each pass corresponds to one another.

Figure 5:
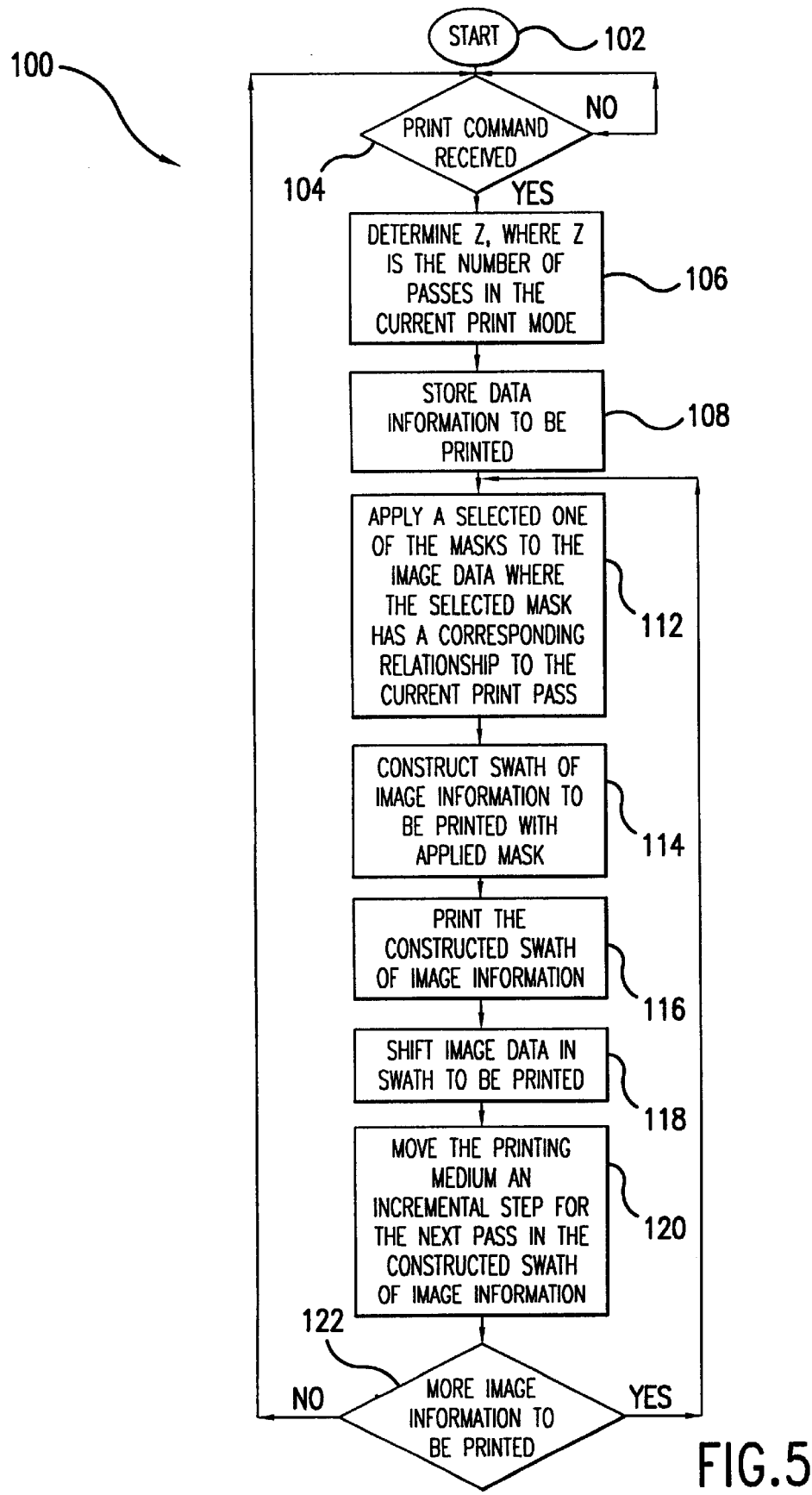
FIG. 5 is a flow chart showing the general steps performed by the printer controller in applying a printmask.

Referring to FIG. 5, the control algorithm 100 is stored in the memory unit 34 and applied by the controller 32 to the image information to be printed. The number of printmasks that are applied via the algorithm 100, to any given area of image data is dependent upon the number of passes employed in a multi-pass print mode. For example, in a two-pass print mode, two printmasks are required. In a four-pass print mode, four printmasks are required. It should be understood that the same printmasks may be utilized for all color planes, or different generated printmasks for each color plane. The number of passes, Z, for printing an image is between about 2 passes and about 16 passes. A more preferred value for Z is between about 3 and about 8, while the most preferred value for Z is about 4.

Control algorithm program 100 begins at a start command 102 when power is applied to the controller 32. The program then proceeds to a decision command 104 to wait for a print command from the computer system 20. In this regard, if no print command is received, the controller 32 loops at the decision step 104 until the print command is received.

After determining the number of passes in the current print mode, the program proceeds to a command step 108 that causes the controller 32 to store in the memory unit data area 44, the information to be printed.

Considering again the control program 100, after step 112 has been performed, the program advances to a command step 114 that causes the swath to be constructed. Next, the program proceeds to a command step 116 that causes swath of image information to be printed.

After the swath of image information has been printed, the program then goes to a command step 118 that causes the image data to be shifted in anticipation of printing that portion of image information to be printed during the next pass of the printing operation.

The program then advances to a command step 120 that causes the printing medium 14 to be advanced incrementally in preparation of printing the next portion of image information.

The program then proceeds to a determination step 122 to determine whether additional image information is to be printed. If additional image information is to be printed the program go to the command step 112 and proceeds as described previously. If no additional image information is to be printed the programs advances to the determination step 104 and waits for the next print command to be received.

It should be understood by those skilled in the art that a different printmask is applied each time the program executes the command step 112. Although a different printmask is applied in each pass, it should be understood by those skilled in the art, that the same printmask is applied for each same numbered pass in each swath to be printed. Thus for example, in a four-pass print mode, printmask number one is applied to the first pass of each four pass sequence, while printmask number four is applied to the last pass in each four pass sequence. In this manner, the same printmasks are uniformly applied on a swath by swath basis to the image information to be printed. The total number of printmasks that are applied in the formation of the desired image to be printed is determined by the total number of passes that will be made to form the image. There is no intention therefore to limit the scope of the number of printmasks applied to any fixed number.

Image data from-the computer system 20 generally is sent to the printing system 10 at resolutions such as 75, 150, 300, or 600 dots per inch (dpi) resolution. However, it is often advantageous to print at a higher resolution that is an integer multiple of the image data resolution, such as 600, 900, 1200, 1800 or 2400 dpi resolution. This often referred to as an "expansion." It is often convenient to view the data resolution as a "pixel" and the expanded resolution as "sub-pixels." Sub-pixel resolution=pixel resolution*n, where n=1, 2, 3, 4,. . . . In addition, printers usually have a "fundamental" resolution which is the smallest increment the printer can store information and "hit" a location on the print media. This resolution is usually quite high, such as 7200 dpi. The sub-pixel resolution=fundamental resolution /n, where n=1, 2, 3, 4, . . . .

Previous printers have always been limited to using black and color printmasks with resolutions that are integer multiples of each other. Printmasks are usually defined as a N×M printmask, where N is the resolution in the print cartridge scan or transverse direction and M is the resolution in the paper movement direction. For example, previous printmasks have included the following resolutions:

| Color | Black |
| --- | --- |
| 300 × 300 | 300 × 300 |
| 300 × 300 | 600 × 300 |
| 300 × 300 | 600 × 600 |
| 600 × 600 | 1200 × 600 |

As can be seen from the above examples, the higher resolution was always equal to n times the lower resolution, where n=1, 2, 3, 4,. . . . This limited the ability to optimize ink saturation and firing frequency for black and color print cartridges because the black and color printmasks, or dot grid patterns, were limited to integer multiples of each other.

The firing frequency is the frequency required to eject one drop per sub-pixel at the scanning carriage speed. The relationship between the firing frequency F in kHz, the scanning carriage speed in inches per second and the resolution or sub-pixel size in dots per inch is defined by the following equation:

Firing Frequency (kHz)=[Carriage Speed (inches/sec)]*[Sub-pixel Resolution (dots/inch)]

However, in accordance with the present invention print quality is improved by using black and color printmasks with resolutions that are non-integral multiples of each other. The ability to optimize ink saturation and firing frequency for black and color print cartridges is improved because the black and color printmasks, or dot grid patterns, are not limited to integer multiples of each other. The present invention allows the number of drops of ink for the black and color dot grids to be non-integral multiples of each other. This allows greater flexibility in placing the optimum amount of ink on the print media for each color.

Figure 7:
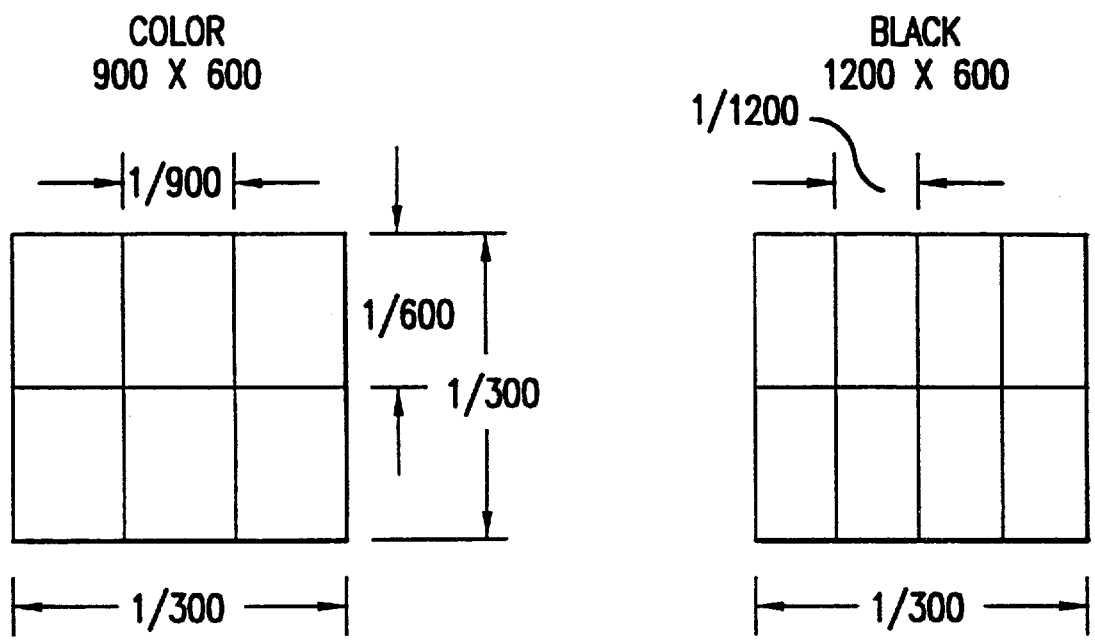
FIG. 7 is a diagrammatic illustration of a 900×600 dpi dot grid for color and a 1200×600 dpi grid for black

In one embodiment of the present invention shown in Table I and FIG. 7, the carriage scans at 30 inches per second, using a 900×600 dpi dot grid for color and a 1200×600 dpi grid for black. This allows the application of the optimum quantity, i.e., number of drops, of color and black ink at the preferred firing frequency of 27 kHz for the color print cartridge and 36 kHz for the black print cartridge.

TABLE I

CARRIAGE SPEED 30 INCHES PER SECOND

| Cartridge | Firing Frequency | Resolution in Scan Direction | Drops/300 dpi Pixel |
|---|---|---|---|
| Color | 27 | 900 dpi | 6 |
| Black | 36 | 1200 dpi | 8 |

Figure 8:
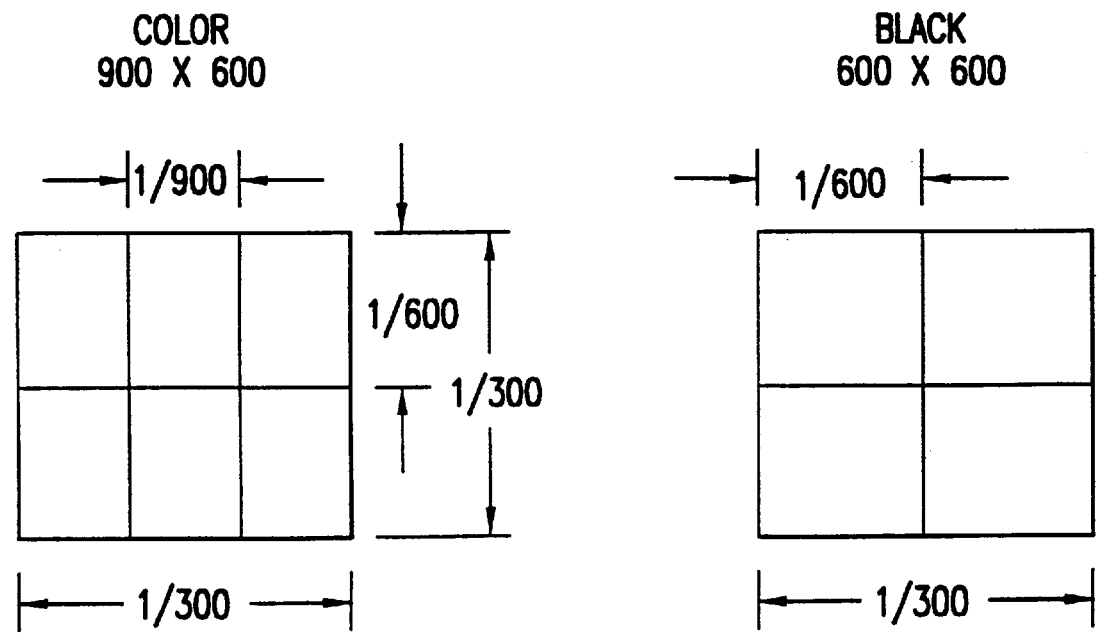
FIG. 8 is a diagrammatic illustration of a 900×600 dpi dot grid for color and a 600×600 dpi grid for black

In another embodiment of the present invention shown in Table II and FIG. 8, the carriage scans at 40 inches per second, using a 900×600 dpi grid for color and a 600×600 dpi dot grid for black. This allows the application of the optimum quantity, i.e., number of drops, of color and black ink at the preferred firing frequency of 36 kHz for the color print cartridge and 24 kHz for the black print cartridge.

TABLE II

CARRIAGE SPEED 40 INCHES PER SECOND

| Cartridge | Firing Frequency | Resolution in Scan Direction | Drops/300 dpi Pixel |
|---|---|---|---|
| Color | 36 | 900 dpi | 6 |
| Black | 24 | 600 dpi | 4 |

Figure 9:
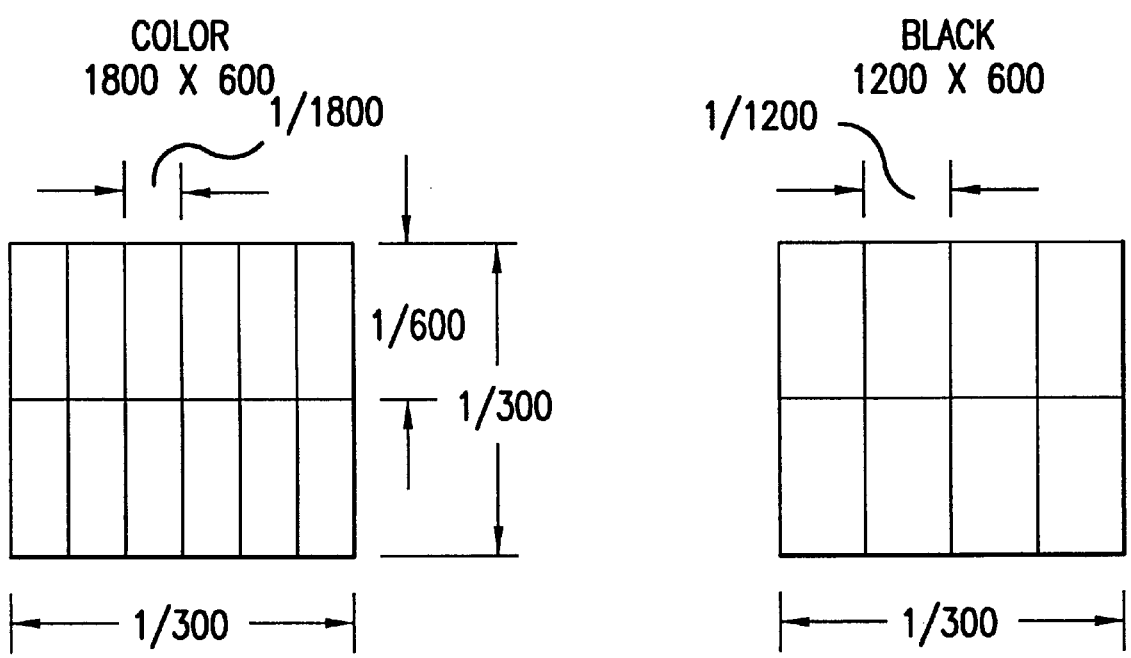
FIG. 9 is a diagrammatic illustration of a 1800×600 dpi dot grid for color and a 1200×600 dpi grid for black

In another embodiment of the present invention shown in Table III and FIG. 9, the carriage scans at 20 inches per second, using a 1800×600 dpi dot grid for color and a 1200×600 grid for black. This allows the application of the optimum quantity, i.e., number of drops, of color and black ink at the preferred firing frequency of 36 kHz for the color print cartridge and 24 kHz for the black print cartridge.

TABLE III

CARRIAGE SPEED 20 INCHES PER SECOND

| Cartridge | Firing Frequency | Resolution in Scan Direction | Drops/300 dpi Pixel |
|---|---|---|---|
| Color | 36 | 1800 dpi | 12 |
| Black | 24 | 1200 dpi | 8 |

The Higher Resolution=N*Lower Resolution, where N is a non-integer value. The above is summarized below in TABLE IV.

TABLE IV

| PRINT CARTRIDGE | | | DROPS/ 300 DPI PIXEL | |
|---|---|---|---|---|
| COLOR | BLACK | N | COLOR | BLACK |
| 900 × 600 | 1200 × 600 | 4/3 | 6 | 8 |
| 900 × 600 | 600 × 600 | 3/2 | 6 | 4 |
| 1800 × 1200 | 1200 × 600 | 3/2 | 12 | 8 |

In accordance with the foregoing black and color dot grids, the drop volume of the black ink is in the range of 12 to 25 picoliters and the drop volume of the color inks is in the range of 2 to 10 picoliters. The dot sizes on the print media for these drop volumes are shown in TABLE V below.

TABLE V

| | DOT SIZE, MICRONS | |
|---|---|---|
| MEDIA TYPE | COLOR | BLACK |
| PLAIN PAPER | 46 | 49 |
| INKJET COATED | 46 | 57 |
| GLOSSY | 33 | 51 |
| TRANSPARENCY | 38 | 55 |
| BROCHURE | 36 | 55 |

From the foregoing it will be appreciated that the printer and method provided by the present invention represents a significant advance in the art. Although several specific embodiments of the invention have been described and illustrated, the invention is not to be so limited In particular, the invention may be used with bi-directional printing where printing passes occur in both directions of movement along the scan direction, or unidirectional printing where printing passes occur only in one direction along the scan direction; with even-advance printmodes where the medium is advanced the same distance between passes, or with uneven-advance printmodes in which the medium is advanced different distances between passes; with multi-pass printers requiring two or more passes to fully print rows on the print medium; with printmasks having any number of cells in width; and with printing systems in which all the components of the printer may not be located in the same physical enclosure.

While particular embodiments of the present invention have been shown and described, it will be obvious to those skilled in the art that changes and modifications may be made within departing from this invention in its broader aspects and, therefore, the appended claims are to encompass within their scope all such changes and modifications as fall within the true spirit and scope of this invention.

What is claimed is:

1. A method of operating a printing system having a printing-medium advance direction and a transverse direction that is perpendicular to the printing-medium advance direction, and a first plurality of ink drop generators and a second plurality of ink drop generators, comprising:

moving the first plurality of ink drop generators along the transverse direction while ejecting first ink drops onto the printing medium in a dot grid pattern having a first resolution in the transverse direction, achievable in a single pass of the first plurality of generators along the transverse direction; and moving the second plurality of ink drop generators along the transverse direction while ejecting second ink droplets onto the printing medium in a second dot grid pattern having a second resolution in the transverse direction, achievable in a single pass of the second plurality of generators along the transverse direction;

said first resolution and said second resolution being non-integer multiples of each other.

2. The method of claim 1, wherein:
the second resolution is N times greater than the first resolution; and
N is a non-integer in the range between 1 and 10.

3. The method of claim 2, wherein:
N is 5/4.

4. The method of claim 2, wherein:
N is 4/3.

5. The method of claim 2, wherein:
N is 3/2.

6. The method of claim 2, wherein:
N is 5/2.

7. The method of claim 1 wherein the first ink droplets and the second ink droplets have the same drop volumes.

8. The method of claim 1 wherein the first ink droplets and the second ink droplets have different drop volumes.

9. The method of claim 1 wherein the first ink droplets and the second ink droplets have the same colorant.

10. The method of claim 1 wherein the first ink droplets and the second ink droplets have different colorants.

11. The method of claim 1 wherein the first ink droplets and the second ink droplets are black.

12. The method of claim 1 wherein the first ink droplets and the second ink droplets are colors.

13. The method of claim 1 wherein the first ink droplets and the second ink droplets are non-integer multiples of each other.

14. The method of claim 1 wherein the first ink droplets are black and the second ink droplets are color.

15. A method of operating a printing system having a printing-medium advance direction and a transverse direction that is perpendicular to the printing-medium advance direction, and a first plurality of ink drop generators and a second plurality of ink drop generators, comprising:

moving the first plurality of ink drop generators along the transverse direction while ejecting first ink drops onto the printing medium in a dot grid pattern having a first resolution in the transverse direction; and moving the second plurality of ink drop generators along the transverse direction while ejecting second ink droplets onto the printing medium in a second dot grid pattern having a second resolution in the transverse direction, said first resolution and said second resolution being non-integer multiples of each other; and wherein:

the first ink droplets create a drop size in the range of 50 to 60 microns on the first dot grid pattern.

16. The method of claim 15, wherein:

the second ink droplets create a dot size in the range of 30 to 50 microns on the second dot grid pattern.

17. A method of operating a printing system having a printing-medium advance direction and a transverse direction that is perpendicular to the printing-medium advance direction, and a first plurality of ink drop generators and a second plurality of ink drop generators, comprising:

moving the first plurality of ink drop generators along the transverse direction while ejecting first ink drops onto the printing medium in a dot grid pattern having a first resolution in the transverse direction; and moving the second plurality of ink drop generators along the transverse direction while ejecting second ink droplets onto the printing medium in a second dot grid pattern having a second resolution in the transverse direction, said first resolution and said second resolution being non-integer multiples of each other; and wherein:

the second ink droplets create a dot size in the range of 30 to 50 microns on the second dot grid pattern.

18. A method of operating a printing system having a printing-medium advance direction and a transverse direction that is perpendicular to the printing-medium advance direction, and a first plurality of ink drop generators and a second plurality of ink drop generators, comprising:

moving the first plurality of ink drop generators along the transverse direction while ejecting first ink drops onto the printing medium in a dot grid pattern having a first resolution in the transverse direction; and moving the second plurality of ink drop generators along the transverse direction while ejecting second ink droplets onto the printing medium in a second dot grid pattern having a second resolution in the transverse direction, said first resolution and said second resolution being non-integer multiples of each other; and wherein:

the first ink droplets are black and the second ink droplets are color; and the first ink droplets have a drop volume in the range of 12 to 25 picoliters.

19. A method of operating a printing system having a printing-medium advance direction and a transverse direction that is perpendicular to the printing-medium advance direction, and a first plurality of ink drop generators and a second plurality of ink drop generators, comprising:

moving the first plurality of ink drop generators along the transverse direction while ejecting first ink drops onto the printing medium in a dot grid pattern having a first resolution in the transverse direction; and moving the second plurality of ink drop generators along the transverse direction while ejecting second ink droplets onto the printing medium in a second dot grid pattern having a second resolution in the transverse direction, said first resolution and said second resolution being non-integer multiples of each other; and wherein:

the first ink droplets are black and the second ink droplets are color; and the second ink droplets have a drop volume in the range of 2 to 10 picoliters.

20. A method of operating a printing system having a printing-medium advance direction and a transverse direction that is perpendicular to the printing-medium advance direction, and a first plurality of ink drop generators and a second plurality of ink drop generators, comprising:

moving the first plurality of ink drop generators along the transverse direction while ejecting first ink drops onto the printing medium in a dot grid pattern having a first resolution in the transverse direction; and moving the second plurality of ink drop generators along the transverse direction while ejecting second ink droplets onto the printing medium in a second dot grid pattern having a second resolution in the transverse direction, said first resolution and said second resolution being non-integer multiples of each other; and wherein:

the first ink droplets are black and the second ink droplets are color; and the first ink droplets have a drop volume in the range of 16 to 20 picoliters.

21. The method of claim 20, wherein:

the second ink droplets have a drop volume in the range of 3 to 5 picoliters.

22. A method of operating a printing system having a printing-medium advance direction and a transverse direction that is perpendicular to the printing-medium advance direction, and a first plurality of ink drop generators and a second plurality of ink drop generators, comprising:

moving the first plurality of ink drop generators along the transverse direction while ejecting first ink drops onto the printing medium in a dot grid pattern having a first resolution in the transverse direction; and moving the second plurality of ink drop generators along the transverse direction while ejecting second ink droplets onto the printing medium in a second dot grid pattern having a second resolution in the transverse direction, said first resolution and said second resolution being non-integer multiples of each other; and wherein:

the first ink droplets are black and the second ink droplets are color; and the first ink droplets have a drop volume in the range of 3 to 5 picoliters.

23. A method of operating a printing system having a printing-medium advance direction and a transverse direction that is perpendicular to the printing-medium advance direction, and a first plurality of ink drop generators and a second plurality of ink drop generators, comprising:

moving the first plurality of ink drop generators along the transverse direction while ejecting first ink drops onto the printing medium in a dot grid pattern having a first resolution in the transverse direction; and moving the second plurality of ink drop generators along the transverse direction while ejecting second ink droplets onto the printing medium in a second dot grid pattern having a second resolution in the transverse direction;

said first resolution and said second resolution, both in the transverse direction, being non-integer multiples of each other; and said dot grid patterns of the first and second plurality of ink drop generators having equal resolution in the printing-medium advance direction.

24. The method of claim 23, wherein:

the second resolution is N times greater than the first resolution; and

N is a non-integer in the range between 1 and 10.

25. The method of claim 24, wherein:

N is 5/4.

26. The method of claim 24, wherein:

n is 4/3.

27. The method of claim 24, wherein: N is 3/2.

28. The method of claim 24, wherein: N is 5/2.

* * * * *